Patented Nov. 10, 1925.

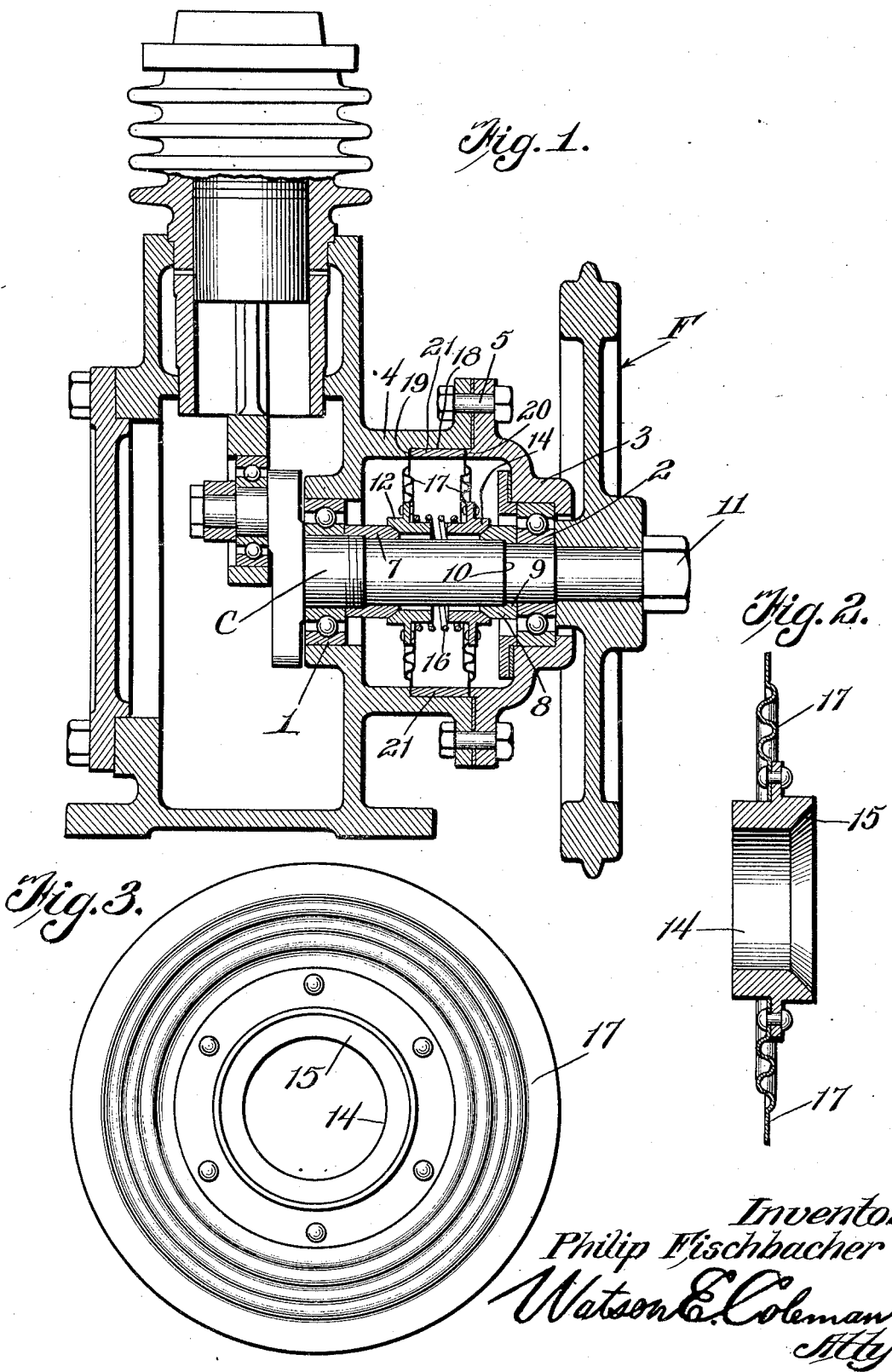

1,561,426

UNITED STATES PATENT OFFICE.

PHILIP FISCHBACHER, OF CHICAGO, ILLINOIS.

STUFFING BOX.

Application filed March 18, 1924. Serial No. 700,123.

*To all whom it may concern:*

Be it known that I, PHILIP FISCHBACHER, a citizen of the United States, residing at Chicago, in the county of Cook and State of Illinois, have invented certain new and useful Improvements in Stuffing Boxes, of which the following is a specification, reference being had to the accompanying drawings.

This invention relates to certain improvements in stuffing boxes and has relation more particularly to a box of this general character especially designed and adapted for use in connection with the crank shaft of a compressor comprised in a refrigerating machine and it is an object of the invention to provide a stuffing box with novel and improved means whereby the same is rendered pressure and vacuum tight.

The invention consists in the details of construction and in the combination and arrangement of the several parts of my improved stuffing box whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a stuffing box constructed in accordance with an embodiment of my invention;

Figure 2 is a sectional view taken through a washer and cup;

Figure 3 is an elevational view of the structure illustrated in Figure 2.

As disclosed in the accompanying drawings, C denotes a crank shaft rotatably supported by the bearings 1 and 2, the bearing 2 being carried by the cap or bearing holder 3 held to the box 4 by the bolts 5 or the like. Mounted upon the inner portion of the shaft C and preferably in threaded engagement therewith as indicated at 6 is a cone 7, said cone providing means for maintaining the bearing 1 in applied position. The shaft C also has fitted thereon immediately adjacent to the outer bearing 2 a second cone 8, said cone 8 being provided at its outer end portion with an inwardly directed flange 9 which abuts an annular shoulder 10 provided on the periphery of the shaft C. The cone 8 is tightened to the shaft C by the fly wheel F from the nut 11 on the outer end of the shaft C, said fly wheel F also holding the outer bearing 2 in applied position.

Freely surrounding the shaft C between the cones 7 and 8 are the cups 12 and 14, the cup 12 seating against the cone 7 and the cup 14 seating against the cone 8, the contacting faces of said cones and cups being correspondingly beveled as indicated at 15 in the accompanying drawings.

Interposed between the cups 12 and 14 is a tension spring 16 which serves to hold the cups 12 and 14 against the cones 7 and 8.

Corrugated spring sheet steel washers 17 surround the cups 12 and 14 and are fastened thereto with airtight joints, the peripheral portions of said washers extending within the internal rabbet 18 formed in the outer portion of the wall of the box 4, the peripheral portion of the inner washer 17 being in direct contact with the annular shoulder or inner wall 19 of the rabbet 18.

The bearing holder or cap 3 is provided with the annular rib or flange 20 which snugly engages within the outer marginal portion of the rabbet 18 and contacts with the periphery of the outer washer 17.

Fitting within the rabbet 18 and snugly fitting between the peripheral portions of the washers 17 is an annular spacer member 21. When the cap or bearing holder 3 is applied, the rib or flange 20 serves to maintain airtight the contacts between the spacer 21 and the peripheral portions of the washers 17.

The space or chamber between the washers 17 is adapted to be filled with grease to provide necessary lubrication and in operation it is to be understood that the cups 12 and 14 are stationary or non-rotatable while the cones 7 and 8 rotate with the shaft C.

From the foregoing description it is thought to be obvious that a stuffing box constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and for-

I claim:—

1. In combination with a box, a cap associated therewith, bearings carried by the cap and the opposed wall of the box, a shaft rotatably engaged with the bearings, cones mounted upon the shaft within the box for rotation therewith and spaced apart, cups freely surrounding the shaft between the cones, a tension spring interposed between and bearing upon the cups to maintain the same in contact with the cones, corrugated spring metal washers secured to the cups and bridging the space between the cups and the peripheral wall of the box, and a spacer interposed between the peripheral portions of the washers, the bearing cap being provided with means to effect an airtight contact between the peripheral portions of the washers and the spacer when the cap is in applied position.

2. In combination with a box, a cap associated therewith, bearings carried by the cap and the opposed wall of the box, a shaft rotatably engaged with the bearings, cones mounted upon the shaft within the box for rotation therewith and spaced apart, cups freely surrounding the shaft between the cones, a tension spring interposed between and bearing upon the cups to maintain the same in contact with the cones, corrugated spring metal washers secured to the cups and bridging the space between the cups and the peripheral walls of the box, and a spacer interposed between the peripheral portions of the washers, the bearing cap being provided with means to effect an airtight contact between the peripheral portions of the washers and the spacer when the cap is in applied position, the cones being positioned immediately adjacent to the bearings and serving to hold the same in applied position.

3. In combination with a box having an internal rabbet at its outer end, a cap associated with the outer end of the box and provided with an annular flange extending within the outer portion of the rabbet of the box, bearings carried by the cap and the opposed wall of the box, a shaft rotatably engaged with the bearings, cones mounted upon the shaft within the box for rotation therewith and spaced apart, cups freely surrounding the shaft between the cones, a tension spring interposed between and bearing upon the cups to maintain the same in contact with the cones, corrugated spring metal washers secured to the cups and bridging the space between the cups and the peripheral wall of the box, the outer marginal portions of said washers extending within the internal rabbet, a spacer interposed between the peripheral portions of the washers, said spacer clamping the peripheral portion of the inner washer against the shoulder at the inner end of the rabbet, and a flange carried by the cap clamping the peripheral portion of the outer washer between said flange and the outer end of the spacer.

In testimony whereof I hereunto affix my signature.

PHILIP FISCHBACHER.